Patented May 4, 1943

2,318,500

UNITED STATES PATENT OFFICE 2,318,500

**PREPARATION OF ASCORBIC ACID AND
l-GULOSONE**

Charles G. King and Elam G. White, Pittsburgh,
Pa., assignors of one-half to Parke, Davis &
Company, Detroit, Mich., a corporation of
Michigan, and one-half to Abbott Laboratories,
North Chicago, Ill., a corporation of Illinois No Drawing. Application October 21, 1935,
Serial No. 46,048

11 Claims. (Cl. 260—209)

The invention relates to a method for synthetically preparing vitamin C.

In the copending application of Charles G. King and William A. Waugh, Serial No. 690,027, filed Sept. 18, 1933, now Patent No. 2,233,417, issued March 4, 1941, it was shown that isolated vitamin C could be obtained from certain natural sources such as lemon juice. It was also shown that isolated vitamin C is a hexuronic acid.

It is now known that vitamin C has the following structural formula:

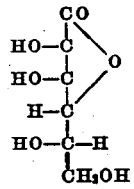

l=ascorbic acid (vitamin C)

and is designated as laevo ascorbic acid.

In accordance with our invention, we have been able to prepare l-ascorbic acid (vitamin C) synthetically from certain chemical compounds which in themselves have no vitamin C activity. We may start, for example, with d-glucose, a known compound, and by a series of steps hereinafter more fully referred to obtain l-ascorbic acid.

In general our method of synthesis comprises the following steps:

(1) Reduction of d-glucose to obtain sorbitol;
(2) Oxidation of sorbitol to l-sorbose;
(3) Conversion of l-sorbose into phenyl osazone of sorbose (identical with l-gulosazone);
(4) Conversion of phenyl gulosazone into l-gulosone;
(5) Oxidation of gulosone to l-alpha-ketogulonic acid;
(6) Conversion of l-alpha-ketogulonic acid to l-ascorbic acid (vitamin C).

Some of the steps in the synthetic preparation as given above were known prior to our invention and it therefore falls within the purview of the present invention to use as a starting material for the synthesis such of the intermediate compounds above referred to as were known prior to our invention. Thus instead of starting with d-glucose the synthesis may begin with sorbitol, l-sorbose or phenyl osazone of sorbose (l-gulosazone).

Our invention relates not only to the method for synthesizing vitamin C but also to the preparation of certain intermediate compounds and to such intermediate compounds themselves as new compositions of matter.

Alpha-keto-l-gulonic acid has the following formula:

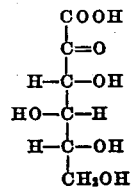

Alpha-keto-l-gulonic acid

Theoretically, alpha-keto-l-gulonic acid can exist in the enolic form having formula:

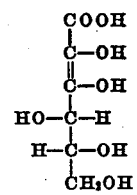

Enolic form of alpha-keto-l-gulonic acid

In this form it may be considered also to be the enolic form of beta-keto-l-gulonic acid. Beta-keto-l-gulonic acid has the following formula:

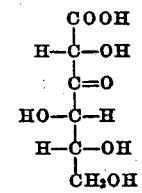

Beta-keto-l-gulonic acid

Prior to the method of synthesizing vitamin C as outlined above it was thought that a synthetic preparation could only be prepared by lactonization of beta-keto-l-gulonic acid to give the gamma-lactone of the following formula:

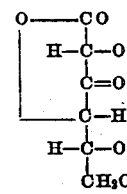

Gamma lactone of beta-keto-l-gulonic acid

The above gamma-lactone can also exist in its corresponding enolic form which is identical with l-ascorbic acid (see formula given previously).

One of the objects of our invention is to provide a synthetic method which can utilize easily available and relatively inexpensive starting materials and which is adaptable to give satisfactory yields.

Other objects of the invention will be more readily apparent after considering the description hereinafter given.

As stated above, phenyl l-gulosazone can be obtained by methods which have previously been described in the literature. Therefore, the synthesis of vitamin C will be described more in detail as to those steps subsequent to the preparation of this compound. A brief description will be given, however, of the first steps of the process. If d-glucose is the starting material, it may be reduced by methods known in the art to obtain sorbitol. The next intermediate, l-sorbose, may be prepared from sorbitol as follows:

Five hundred grams of compressed baker's yeast is boiled with stirring for ½ hour, centrifuged, and the supernatant liquid diluted with an equal amount of water. Sorbitol is added to the above liquid to give a 5–10% solution and 500 cc. aliquot portions of this solution are sterilized in 1-liter Erlenmeyer flasks. After cooling, 2.5 cc. of glacial acetic acid are added and the liquid inocculated with acetobacter xylinum. After the reducing sugar content reaches a maximum (usually six to nine weeks) the solution is filtered and pressed out from the thick bacterial films (cellulose), clarified and concentrated. The l-sorbose is present in the solution.

The l-sorbose may then be converted into phenyl l-gulosazone by the following method:

Sixty cc. of phenyl hydrazine and 32 cc. of glacial acetic acid are added to 32 g. of l-sorbose in concentrated aqueous solution. The mixture is stirred for two hours at 70° C., allowed to stand overnight, filtered, washed with dilute acetic acid and water and dried. Yields of 70 to 75 percent of phenyl l-gulosazone are easily obtained by this method.

*Synthesis of vitamin C from phenyl l-gulosazone*

Phenyl l-gulosazone prepared in accordance with the methods given above or obtained from any other source may be used for the synthesis of vitamin C and the following is a specific example of a method which may be used in accordance with our invention.

Twenty grams of phenyl l-gulosazone are dissolved in a solution of 220 cc. of ethanol, 920 cc. $H_2O$ and 20 cc. glacial acetic acid at 90 to 95° in a 2-liter, 3-necked flask equipped with a reflux condenser and a mercury seal. Thirty-two grams of benzaldehyde are then added and the mixture stirred vigorously for 1½ hours in an atmosphere of nitrogen at 90 to 95°. The reaction mixture is then cooled, filtered, extracted five times with ether, and concentrated. A syrup remains containing approximately 2 g. of l-gulosone. This syrupy l-gulosone may be used for the next step in the synthesis comprising oxidation to alpha-keto-l-gulonic acid, or, if desired, the syrup may be extracted with absolute alcohol and the alcoholic solution evaporated to dryness in a high vacuum to give a white mass of the solid l-gulosone.

To an aqueous solution of 5 g. of l-gulosone, 1.4 cc. of bromine is added slowly with stirring, after which the solution is allowed to stand at room temperature for two days. The excess bromine is removed by bubbling nitrogen gas through the solution. The hydrobromic acid is removed by adding basic lead carbonate to the solution and filtering off the lead bromide. The excess lead is removed from the filtrate by precipitation with hydrogen sulfide and filtering off the resulting lead sulfide. The filtrate is then concentrated to a syrup at low temperature and in a vacuum to leave behind a syrupy mass of the resulting alpha-keto-l-gulonic acid.

The syrupy alpha-keto-l-gulonic acid thus obtained probably contains some synthetic vitamin C (lactone form of the acid) with which it is in equilibrium.

The syrupy material from the bromine oxidation is treated with 20 cc. of 0.2 N HCl and allowed to stand four days at room temperature. The solution is then evaporated to a syrup under diminished pressure in a $CO_2$ atmosphere at 50° C. and extracted with acetone. (If there is a residue at this point, the acetone solution may be filtered from it, the residue treated for two hours longer with 20 cc. of 0.2 N HCl at 90 to 100° C. in a $CO_2$ atmosphere, the solution evaporated to a syrup and extracted with acetone, and filtered, if necessary to separate from any residue.) The two acetone solutions are combined. Titration of a sample of the combined acetone solutions with 2,6-dichlorophenolindophenol shows that approximately 0.6 g. of vitamin C is obtained at this point. The combined acetone solutions are then evaporated to dryness in a $CO_2$ atmosphere at 50° C. The residue remaining has a protective action against scurvy, as is shown by animal assay using 1 mg. per day, after previous depletion of guinea pigs on a scorbutic diet. This anti-scorbutic activity has a value corresponding to the titration value obtained with 2,6-dichlorophenolindophenol.

This residue after evaporating off the acetone is a syrupy product and may be used in this form for its antiscorbutic activity or it may be further purified to obtain a crystalline product. The syrupy residue is taken up in a small volume of alcohol and a larger quantity of absolute ether added to precipitate out any impurity, which can be filtered off. The filtrate is then taken down to dryness in a vacuum and the residue triturated with a little benzene or petroleum ether or a mixture of equal parts of absolute alcohol and petroleum ether and the triturated mixture allowed to stand at low temperature with occasional stirring to induce crystallization. An alternate process involves conversion into the insoluble lead salt, recovery of the vitamin, and then crystallization from organic solvents as above indicated. In this manner a product melting at 182° to 184° C. is obtained which agrees in this and other properties with the vitamin isolated from natural sources.

Other purification processes may be used, such for example as set forth in the final purification of vitamin C from natural sources, as set forth in Patent No. 2,233,417 previously referred to.

The process of our invention may, of course, be carried out with various modifications not specifically disclosed in the above examples of the steps of the process. For example, instead of using benzaldehyde in preparing the l-gulosone from the gulosazone, substituted benzaldehydes such as bromo or nitro-benzaldehyde may be used. Moreover, in rearranging the alpha-keto-l-gulonic acid to the l-ascorbic acid, controlled autoclaving may be used. Alkali may also be used.

Other reagents and other variations in the details which will be obvious to any worker skilled in this art may be used for carrying out our new synthesis of vitamin C which may be essentially represented by the following series of reactions:

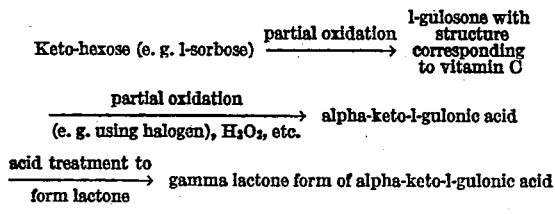

$$\text{Keto-hexose (e. g. l-sorbose)} \xrightarrow{\text{partial oxidation}} \text{l-gulosone with structure corresponding to vitamin C}$$

$$\xrightarrow[\text{(e. g. using halogen), H}_2\text{O}_2\text{, etc.}]{\text{partial oxidation}} \text{alpha-keto-l-gulonic acid}$$

$$\xrightarrow[\text{form lactone}]{\text{acid treatment to}} \text{gamma lactone form of alpha-keto-l-gulonic acid}$$

$$\xrightarrow[\text{rearrangement to enol form}]{} \text{l-ascorbic acid (vitamin C)}$$

The last two steps occur practically simultaneously.

What we claim as our invention is:

1. The process for synthesizing vitamin C comprising the oxidation of l-gulosone to obtain alpha-keto-l-gulonic acid and converting the same into l-ascorbic acid.

2. The process for synthesizing vitamin C from sorbitol comprising converting sorbitol by fermentation into l-sorbose, treating l-sorbose with phenyl hydrazine to obtain phenyl-l-gulosazone, hydrolizing to obtain l-gulosone, oxidizing to obtain alpha-keto-l-gulonic acid and converting said acid into l-ascorbic acid.

3. In the process of synthesizing vitamin C, the step comprising the treatment of l-gulosone with an oxidizing agent capable of converting its terminal aldehyde group to a carboxy group to obtain alpha-keto-l-gulonic acid.

4. In the process for synthesizing vitamin C the step comprising treating a solution of l-gulosone with bromine for about two days, removing excess bromine with nitrogen, removing hydrobromic acid with basic lead carbonate, removing excess lead carbonate with hydrogen sulfide, concentrating the remaining solution to a sirup containing alpha-keto-l-gulonic acid.

5. The process for synthesizing vitamin C comprising treating a solution of alpha-keto-l-gulonic acid with dilute mineral acid, evaporating under diminished pressure in a non-oxidizing atmosphere to obtain a syrup, extracting the syrup with acetone, removing the acetone, dissolving the residue in alcohol, precipitating impurities with ether, removing alcohol and ether, taking up the residue in ether and crystallizing l-ascorbic acid from the ether at low temperature.

6. In the process for obtaining a compound having antiscorbutic properties, the step comprising the treatment of l-gulosone with an oxidizing agent capable of converting its terminal aldehyde group to a carboxyl group.

7. In the process of synthesizing vitamin C, the step comprising the treatment of l-gulosone with an oxidizing agent of the class consisting of halogen and hydrogen peroxide.

8. In the process for obtaining a compound having antiscorbutic properties, the step comprising the treatment of l-gulosone with bromine to convert the terminal aldehyde group to a carboxyl group.

9. In the process for obtaining a compound having antiscorbutic properties, the step comprising the treatment of l-gulosone with hydrogen peroxide to convert the terminal aldehyde group to a carboxyl group.

10. The process for synthesizing vitamin C comprising treatment of l-gulosone with an oxidizing agent capable of converting its terminal aldehyde group to a carboxyl group, treating the product thus obtained to form a lactone which upon rearrangement to the enol form is l-ascorbic acid.

11. l-Gulosone.

CHARLES G. KING.
ELAM G. WHITE.